United States Patent

Lawrence

[11] Patent Number: 5,524,505
[45] Date of Patent: Jun. 11, 1996

[54] CHAIN BINDER EXTENSION HANDLE

[75] Inventor: Phillip G. Lawrence, Spring Lake, Mich.

[73] Assignee: Hodgeon & Anderson, Inc., Muskegon Hts., Mich.

[21] Appl. No.: 182,449

[22] Filed: Jan. 18, 1994

[51] Int. Cl.⁶ ............................... G05G 1/04; B25G 1/04
[52] U.S. Cl. .......................... 74/544; 81/177.2; 16/114 R
[58] Field of Search ........................... 74/544, 557, 524; 81/177.1, 177.2, 488; 16/114 R; 254/DIG. 3

[56] References Cited

U.S. PATENT DOCUMENTS

| | | |
|---|---|---|
| 1,483,002 | 2/1924 | Lane . |
| 2,986,054 | 5/1961 | Lurie . |
| 3,119,278 | 1/1964 | Simpson . |
| 3,152,391 | 10/1964 | Bjorn et al. . |
| 3,179,372 | 4/1965 | Vaudreuil . |
| 3,219,316 | 11/1965 | Fried . |
| 3,657,944 | 4/1972 | Able . |
| 3,843,981 | 10/1974 | Verest . |
| 3,864,769 | 2/1975 | Hamilton . |
| 4,115,669 | 9/1978 | Cali . |
| 4,297,916 | 11/1981 | Burroughs . |
| 4,366,607 | 1/1983 | MacCuaig . |
| 4,512,062 | 4/1985 | Crook, Jr. . |
| 4,756,181 | 7/1988 | Appelgren . |
| 4,895,042 | 1/1990 | Wang . |

*Primary Examiner*—Charles A. Marmor
*Assistant Examiner*—Mary Ann Battista
*Attorney, Agent, or Firm*—Waters & Morse

[57] ABSTRACT

A chain binder extension handle comprises an engagement member that fits on a chain binder handle, a gripping member pivotally mounted on the engagement member for limited angular movement between an aligned position and a skewed position with respect to the engagement member, and a coil spring that urges the members toward their aligned positions and resiliently resists the bending force exerted on the handle as the chain binder snaps into or out of a locked position.

15 Claims, 3 Drawing Sheets

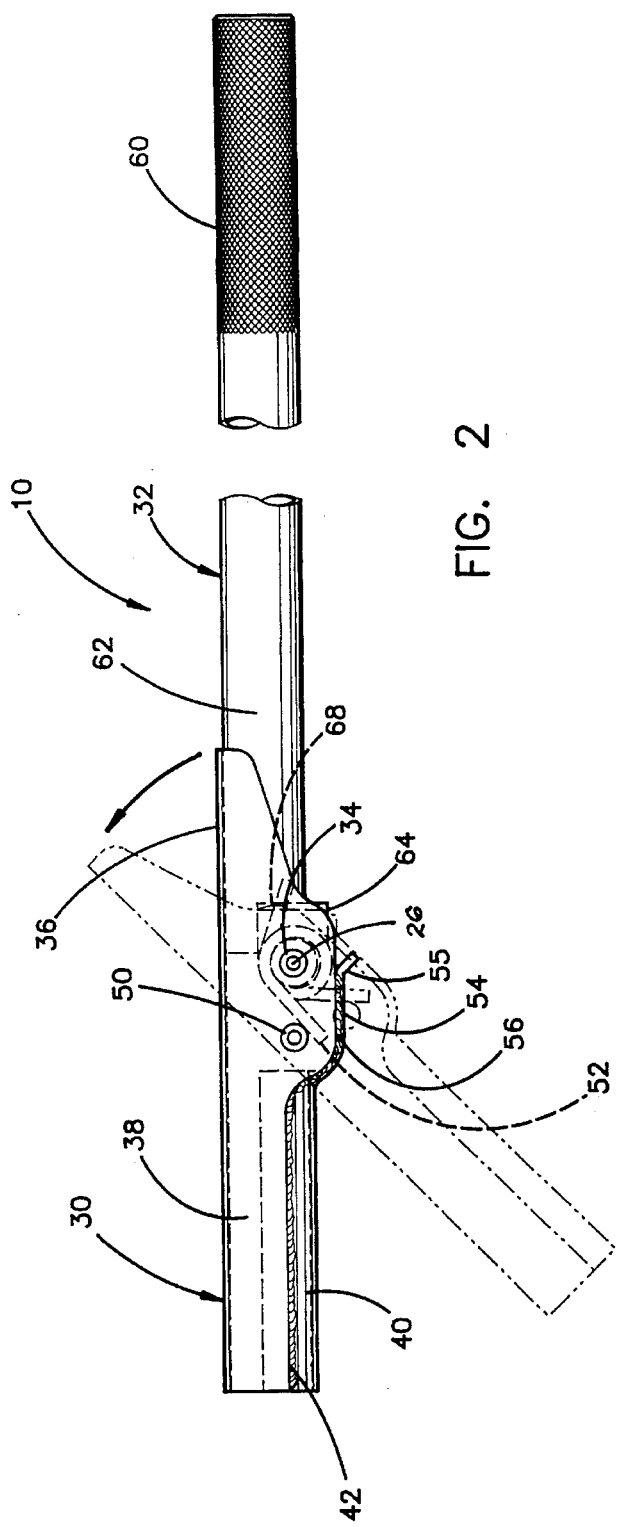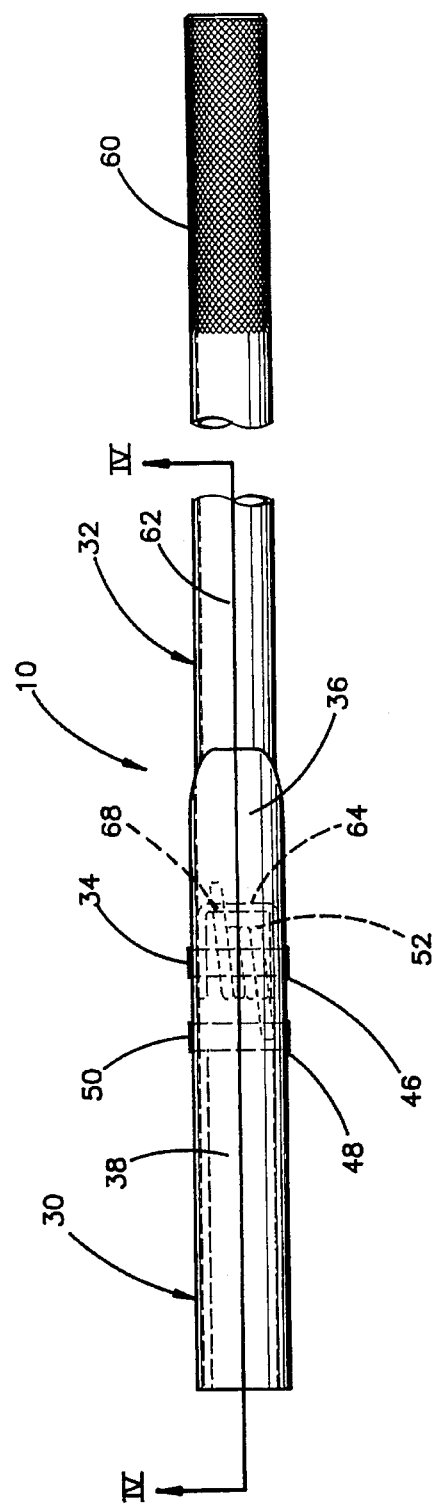

CHAIN BINDER EXTENSION HANDLE

BACKGROUND OF THE INVENTION

This invention relates to an extension handle for increasing the leverage applied to a relatively short handle. More particularly, this invention relates to a pivotal extension handle for tightening or releasing a chain binder into or out of a tightened position.

Chains and chain binders enjoy wide-spread use in the transportation industry for securing loads. The chain binder is particularly useful in securing elongated nearly-cylindrical objects such as steel tubes and logs to a truck or railway bed. Depending upon the size and regularity of the load to be secured, one to five load securing devices may be required. In a conventional arrangement, each load securing device uses two chains and one chain binder to secure a portion of the load. Each chain is secured to alternate sides of the truck bed through a hook and eye mechanism. The two chains are then fastened together with the use of the chain binder.

A conventional chain binder includes an operating lever connected to a pair of tensile load carrying members in the form of toggle links pivotally connected at spaced locations along the lever. The load carrying members usually include hooks which are connected to individual links of the chains. As the operating lever is pivoted from an open position to a closed position, the distance between the chain binder toggles is shortened through the buckling operation to secure the load. The chain binder snaps into a locked position after the toggle pivot connections reach an over center position. The tension in the binder exerted through the chains then continues to hold the binder in the buckled position. To release the load, the operating lever is retracted to its previous position which releases the pivotal connections from their overlapped condition. As the operating lever reaches the over center position, it has a tendency to snap into the unbuckled or open position. MacCuaig, U.S. Pat. No. 4,366,607 shows a representative over center-type load binder with an operating lever.

A considerable amount of force is generally used to secure the two chains together. A tighter connection is more desirable to reduce load shift during transport. However, even the most tightly secured load may settle or shift during the course of its journey. This has the effect of intensifying the existing force on the chain binder.

To tighten or release the chain binder handle into and out of a locked position, an extension handle is normally employed. Various rigid extension handles such as crowbars and pieces of plumbing pipe or steel tubing have been used to increase leverage. These make-shift extension handles have presented many dangers.

When the chain binder is engaged or released, and particularly when it is released, it has a tendency to violently and uncontrollably snap. This snap presents substantial danger to the operator and particularly his hands and upper body which are in close proximity. These dangers are compounded by the use of a conventional extension handle. The conventional extension handle rigidly follows the arc of the binder handle at an increased distance as the binder is released. This increases the possibility for contact with the operator. Contact may result in serious injury since the entire force from the binder is transmitted to the operator through the handle. The conventional rigid extension handle also has a tendency to slip from the binder handle and pose additional danger as a lethal projectile.

Various types of extension handles have attempted to overcome the dangers associated with the use of chain binders. Extension handles have been used which remain rigid when moved in a first direction and which pivot when moved in a second direction. Simpson U.S. Pat. No. 3,119,278 is representative. The pivoting action of prior extension handles have allowed the handle to pivot freely as the chain binder snaps into position. The free rotation of the respective members permits the velocity of the chain binder lever to remain unchecked, which can present safety and control problems.

SUMMARY OF THE INVENTION

The present invention is an extension handle for releasably engaging the relatively short operating handle of a chain binder. The extension handle includes a binder engagement member pivotally connected to a gripping member at a pivotal connection. The respective members are resiliently urged into a linear relation by a resilient biasing means. The extension handle remains rigid as force is applied to the chain binder in a first direction but resiliently bends in an opposite second direction as the chain binder snaps into or out of a locked position. This provides a safety feature while still providing operator control over the movement of the chain binder handle.

The chain binder engagement member comprises a tubular section with the pivotal connection disposed at an outer end thereof. The tubular section is structurally reinforced to provide a tight fit around the chain binder handle and increase durability. The tubular section has a recess in an opposite end from the pivotal connection. The recess releasably engages the relatively short operating handle of the chain binder by physical placement thereon. The engagement member also includes an elongated section which extends directionally opposite from the recess. This elongated section extends beyond the pivotal connection and is configured to contact a first side of the manual gripping member. The elongated section constitutes a stop mechanism that limits rotation of the binder engagement member in a first direction with respect to the manual gripping member. The engagement member also includes a second stop member that limits pivotal movement of the engagement member to a predetermined angle (preferably 45°) in a second direction.

The manual gripping member is attached to the binder engagement member along the pivotal connection. The gripping member includes contact surfaces which are configured to abut the elongated section and stop member of the engagement member. Through abutment of the contact surfaces with the elongated section and stop member, the extension handle is confined to pivotal rotation from an aligned position through a predetermined angle in the second direction. When force is applied to the chain binder from the extension handle, the contact surface and elongated section allow the extension handle to act as a rigid handle. However, the two members may still pivot with respect to one another as the chain binder operating handle snaps into and out of a locked position.

A resilient biasing means connects the binder engagement member with the manual gripping member along the pivotal connection. This urges the respective members into the linear relation and also provides increasing resistance to the force produced by the chain binder operating handle as it snaps into and out of the tightened position. The resilient biasing means is preferably a helical spring positioned around the pivotal connection which contacts the engagement member and gripping member.

With the present invention, the snapping force is sufficiently resisted to prevent injury, but the operator still maintains control over the extension handle and the chain binder itself. When the binder handle snaps, the operator retains his grasp on the gripping member while the resilient biasing means exerts increasing pressure on the handle to gradually decrease the velocity of the chain binder handle. This promotes safety for the operator while increasing operator control over the chain binder handle during a release or binding operation.

BRIEF DESCRIPTION OF THE DRAWINGS

FIG. 2 is side view showing the movement of the lever arm with respect to the handle support.

FIG. 3 is a top view showing placement of the channel mount and spring support rivet with respect to the head cap and handle support.

DETAILED DESCRIPTION OF THE PREFERRED EMBODIMENT

Figure 1:
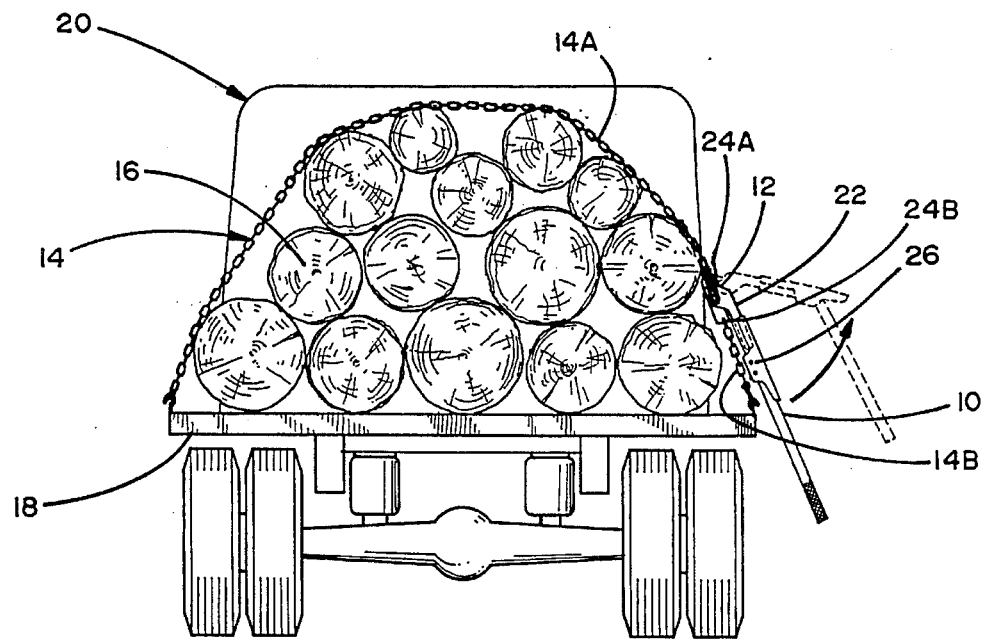
FIG. 1 is a side elevational view of the chain binder extension handle releasing a load by increasing the leverage applied to a chain binder.
Figure 4:
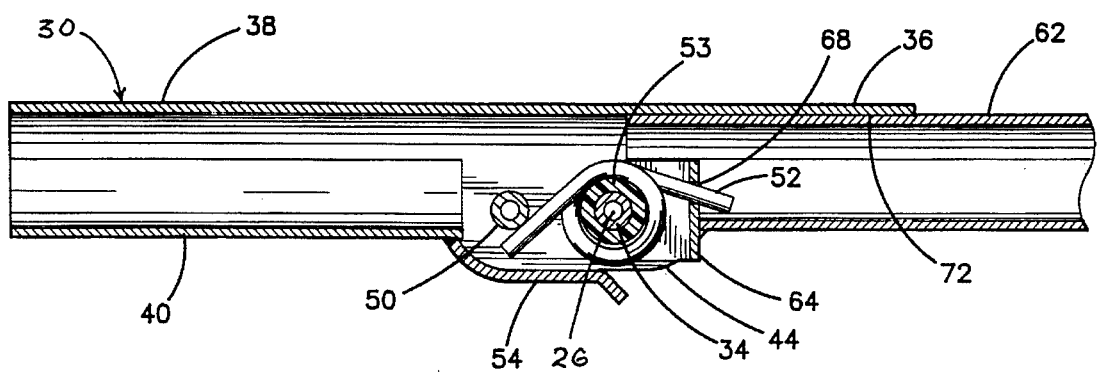
FIG. 4 is a cross section taken along line 4—4 of FIG. 3.
Figure 5:
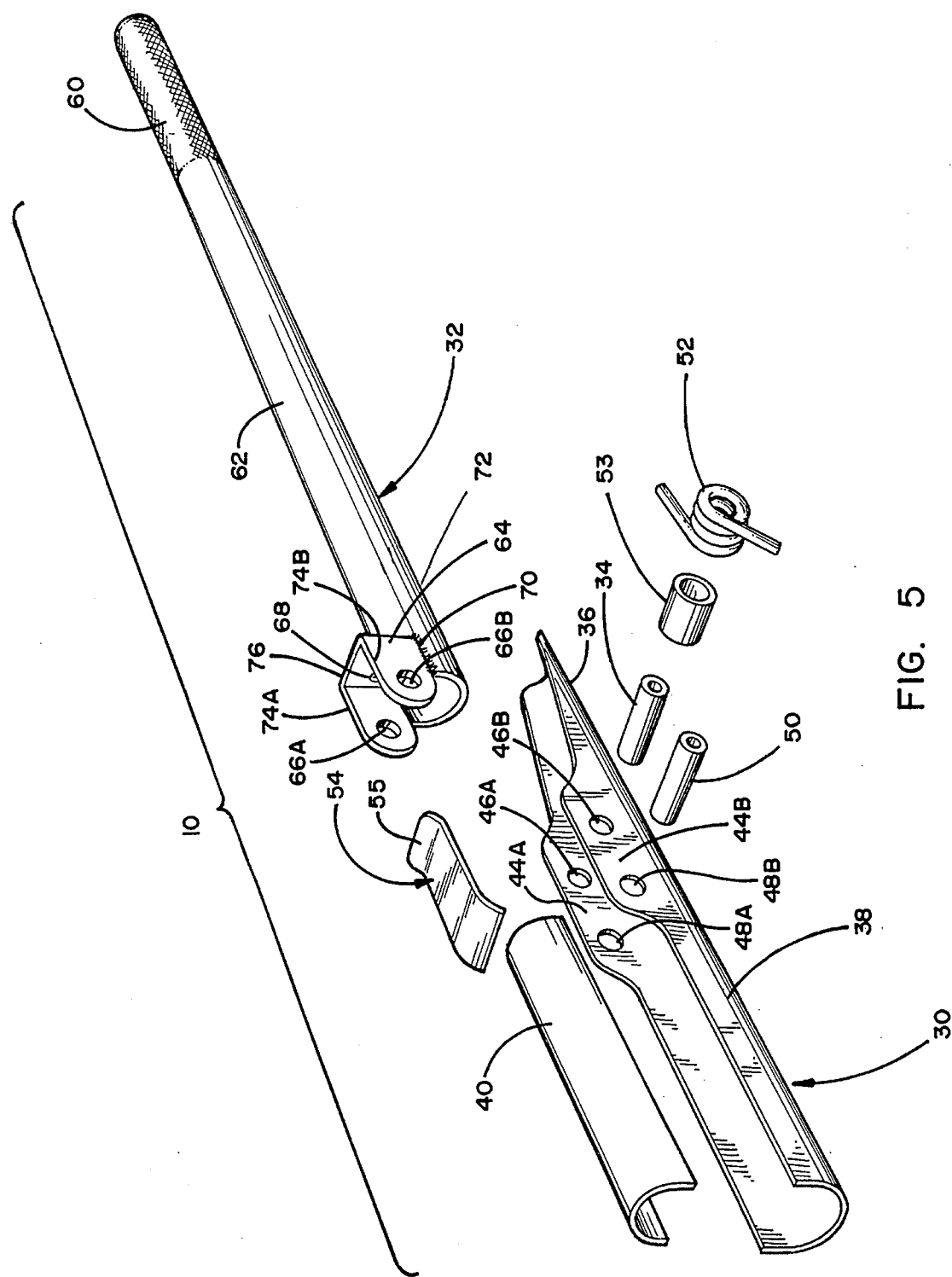
FIG. 5 is an exploded perspective view of the present invention.

FIG. 1 shows the chain binder extension handle 10 in use during a conventional releasing operation. Load 16 is carried on a truck bed 18 of truck 20. Chain 14 secures load 16 to truck bed 18 through a first chain section 14A and a second chain section 14B. The respective chain sections are connected using chain binder 12. Extension handle 10 increases the leverage applied to chain binder 12 to thereby release or secure load 16.

Conventional chain binder 12 includes chain binder operating handle 22, with first and second toggle links 24A and 24B. Chain binder 12 connects to first chain section 14A through first toggle link 24A. Chain binder 12 also connects to second chain section 14B through second toggle link 24B. The toggle links 24 are drawn together into an overlapping position as operating handle 22 is moved downwardly from an open position to a closed position. Alternatively, toggle links 24 move apart as operating handle 22 is moved upwardly from the closed position to the open position (FIG. 1 orientation). This is generally accomplished through the buckling or unbuckling of the toggle links 24 upon themselves in response to movement of the operating handle 22.

To release the load 16 as shown in FIG. 1, chain binder operating handle 22 is manipulated upwardly from the closed position to the open position. Extension handle 10 fits over operating handle 22 to increase leverage during this releasing operation. As shown in phantom in FIG. 2, when the toggle links pass an overtravel position the chain binder handle snaps forcefully upwardly. When this happens, extension handle 10 pivots about pivot axis 26 as the operating handle is moved to the released position to allow greater control over the releasing operation.

The procedure is reversed to secure the load. Operating handle 22 is moved from the open to the closed position to decrease the distance between the respective toggle links. This firmly secures load 16 to truck bed 18 with chain 14. To assist in the securing operation, extension handle 10 is axially rotated 180° from its position in FIG. 1. Extension handle 10 then remains rigid as force is applied downwardly. As operating handle 22 of chain binder 12 snaps into the secured position, extension handle 10 may pivotally deform about pivot axis 26 to prevent injury and allow greater control.

In reference to FIGS. 2–5, extension handle 10 includes binder engagement member 30 and manual gripping member 32. These respective members are pivotally mounted together about pivot axis 26 by pin 34. The members can pivot with respect to each other when a pivot force is applied in a second direction, but they remain in alignment, making them effectively rigid, when force is applied in a first direction opposite to the second direction. Spring 52 urges the binder engagement member and manual gripping member into this aligned relation.

Binder engagement member 30 is tubular and has an open outer end that fits snugly over the operating handle 22 of chain binder 12. When placed thereon, lateral movement is restricted such that engagement member 30 and operating handle 22 move as one. Binder engagement member 30 is formed from head cap 38, head jaw 40 and head stop 54. Head cap 38 is permanently affixed to head jaw 40 along jaw seam 42. Jaw seam 42 is preferably a metal weld. Head cap 38 is generally U-shaped which allows the somewhat narrower U-shaped head jaw 40 to be disposed therein. A small amount of overlap occurs between the two which increases the strength of engagement member 30 and facilitates ease of manufacture.

Head cap 38 includes flanges 44 along the sides thereof for connection to head stop 54. Flaps 44 are distinct lateral protrusions from the U-shaped sides of head cap 38. Flaps 44 are substantially parallel with each having a nearly symmetrical oblong relation. The sides of flaps 44 are curved to resist injury to-an operator. Stop rivet holes 48A and 48B and pivot rivet holes 46B and 46B extend through each of the flaps 44 respectively. Pivot rivet hole 46 allows the pivotal connection about pivot axis 26 between engagement member 30 and gripping member 32. Stop rivet 50 is permanently affixed to flaps 44 through placement in stop rivet hole 48. Likewise, pivot rivet 34 is permanently affixed to flaps 44 through placement in pivot rivet hole 46. Headcap 38 also includes elongated section 36. Elongated section 36 is an axial protrusion extending outward from the proximal end of head cap 38. Elongated section 36 is the portion of head cap 38 extending beyond flaps 44. Elongated section 36 is configured to abut gripping member 32. Elongated section 36 thereby prevents clockwise pivotal movement of the member 30 with respect to member 32 past the aligned position shown in FIG. 2 as a counterclockwise force is applied to the gripping member. When the forces are reversed, the engagement member 30 can pivot in a counterclockwise direction with respect to the engagement member 32.

Head stop 54 connects flaps 44 along the underside of head cap 38. Head stop 54 is permanently affixed to flaps 44 along head stop seam 56 which is preferably a metal weld. Through placement thereon, head stop 54 strengthens engagement member 30. Head stop 54 also limits the pivotal movement of engagement member 30 with respect to gripping member 32 in a second or clockwise direction (FIG. 2). Head stop 54 is configured to follow the curved shape of flaps 44. A curved portion 55 of head stop 54 extends away from flaps 44 and is not welded along head stop seam 56. The curved portion 55 increases the surface area of head stop 54 which contacts gripping member 32. Curved portion 55 also increases the strength of head Stop 54 through the increased surface area.

Manual gripping member 32 includes cylindrical tube 62 with a gripping surface 60 formed at a distal end thereof. Gripping surface 60 provides a rough surface for decreasing the possibility of manual slippage from the end of cylindrical tube 62. Cylindrical tube 62 is preferably hollow steel tubing or pipe but may be a solid metal rod. Channel mount 64 is located at the proximal end of cylindrical tube 62. Channel mount 64 is permanently affixed to the end of cylindrical tube 62 by channel mount seam 70. Channel mount seam 70 is preferably a metal weld. Contact surface 72 is provided on the proximal end of cylindrical tube 62 opposite from channel mount 64. Contact surface 72 is configured to contact elongated section 36 of engagement member 30 to thereby limit pivotal movement of the respective members to a predetermined angle.

Channel mount 64 is generally U-shaped with channel flaps 74 projecting outwardly from channel base 76. Channel mount seam 70 connects each of channel flaps 74 and channel base 76 to cylindrical tube 62. Passing through each of channel flaps 74, are pivot holes 66A and 66B. Channel mount 64 is configured to allow axial alignment of pivot hole 66 with pivot rivet hole 46. Pivot hole 66 is coaxial with pivot axis 26. Passing through channel base 76 is spring engagement hole 68. Spring engagement hole 68 is positioned to engage an end of spring 52. Spring 52 urges gripping member 32 into linear relation with engagement member 30 through placement in spring engagement hole 68.

Coil spring 52 biases engagement member 30 and gripping member 32 into the linear relation. Spring 52 is positioned around spring bushing 53. Spring 52 and spring bushing 53 are positioned between flaps 44 of head cap 38 and in between channel flaps 74 of channel mount 64. Pivot rivet 34 passes through pivot rivet hole 46B in flap 44B, through pivot hole 66B of channel flap 74B, through spring bushing 53, through pivot hole 66A of channel flap 74A and into pivot rivet hole 46a of flap 44a. Through this combination, engagement member 30 may pivot with respect to gripping member 32. Spring 52 is positioned so that one end thereof passes through spring engagement hole 68 in channel base 76. Another end of spring 52 is positioned against stop rivet 50.

With this configuration, binder engagement member 30 pivots with respect to manual gripping member 32 about pivot axis 26. Elongated section 36 of head cap 38 confines the pivotal rotation to a predetermined angle by abutting against contact surface 72 of cylindrical tube 62. This confines rotation about pivot axis 26 to a predetermined angle and retains extension handle 10 in a rigid relation as force is applied to chain binder 12. The predetermined angle is further constricted to an angle less than 180° through the contact of head stop 54 with channel flaps 74A and 74B of channel mount 64. A predetermined angle of less than 90° provides greater control of the engagement member during operation. While a variety of predetermined angles will accomplish the objectives of the present invention, the preferred angular limitation is 45°. A shorter angular limitation prevents the chain binder operating handle from achieving a higher velocity as it snaps into or out of the locked position. However, some angular rotation must be permitted for the biasing means to properly function.

FIG. 3 is a top view of extension handle 10 shown in the linear position. Head cap 38 of engagement member 30 is shown with stop rivet 50 and pivot rivet 34 passing therethrough. Each of these rivets protrude slightly beyond the periphery of head cap 38. The ends of these rivets are then plastically deformed to prevent removal from stop rivet hole 48 and pivot rivet hole 46 respectively.

Manual gripping member 32 is shown with gripping surface 60 externally exposed and channel mount 64 internally connected to pivot rivet 34. Spring 52 is shown as a helical spring wrapped around pivot rivet 34. Spring 52 is in contact with stop rivet 50 and channel mount 64. A portion of spring 52 is respectively positioned within spring engagement hole 68 of channel mount 64.

While the preferred practice of biasing engagement member 30 and gripping member 32 into linear relation is a helical spring, the present invention contemplates a variety of biasing means including but not limited to an elastic rubber strip, an elastic metal strip or a deformable rubber wedge. This preferred spring made from metal components. However, the inventive concepts will be found in a similar device incorporating plastic or non-metallic parts.

In operation, the open end of the binder engagement member is placed on the short handle of the chain binder, with elongated section 36 being positioned on the side of the extension handle in the direction of handle travel in opening or closing the chain binder. The gripping member 32 is moved in the desired direction to open or close the chain binder. Tube 62 bears on section 36 to cause the handle to act like a rigid bar when force is applied to the gripping member in the direction of movement. After the chain binder toggle link pivots past its overtravel position the link snaps completely open or closed, as the case may be. When this occurs, the binder engagement member pivots rapidly and forcefully with handle 22 away from the gripping member 32. Since section 36 is only on one side of the tube 62, the binder engagement member can pivot with respect to the handle. As this occurs, the spring resiliently yields, cushioning or damping the snapping action of the binder handle while letting the operator hang on to the handle. This improves both the control and safety of the extension handle.

The foregoing embodiments are intended to be illustrative of the preferred practice of the present invention and are not intended to limit the scope of the invention which is defined in the appended claims.

I claim:

1. A chain binder extension handle comprising:

a binder engagement member that fits on a chain binder handle, so as to be movable therewith;

an elongated gripping member pivotally attached to the binder engagement member at a pivot axis adjacent one end of the gripping member;

stop means for preventing pivotal movement of the binder engagement and gripping members out of a generally aligned position when a pivotal force is applied on the members in a first direction but permitting at least limited pivotal movement of the members when a pivotal force is applied on the members in a second direction opposite to the first direction; and resilient biasing means extending between the members for resiliently urging the members to remain in alignment, the resilient biasing means providing controlled, resilient resistance to pivotal movement of the members out of their aligned position in the second direction, such that the extension handle can be positioned to act like a rigid rod for applying force in the first direction to open or close a chain binder but resiliently pivoting in a controlled manner in the second direction to prevent operator injury when the chain binder handle snaps open or closed after the chain binder handle passes an overtravel position.

2. The chain binder extension handle according to claim 1 wherein:

the binder engagement member comprises a U-shaped head cap member having a closed back wall, parallel side walls and an open front side, the pivot axis being positioned between opposite ends of the head cap member, a head jaw enclosing the open front side of the head cap member at one end of the head cap member to form a recess for the chain binder handle;

the gripping member comprising an elongated shaft that fits in the open front side of the head cap member and is pivotally mounted thereto by a pivot pin that extends through the parallel side walls of the head cap member at the pivot axis, the shaft being pivotally mounted to the pivot pin at a point adjacent an end of the shaft, a portion of the head cap member on an opposite side of the pivot axis from the recess for the chain binder handle constituting an extended section of the binder engagement member that abuts one side of the shaft so as to prevent the shaft from pivoting in the first direction with respect to the binder engagement member.

3. The chain binder extension handle according to claim 1 wherein the stop means comprises an elongated section of the binder engagement member that extends along one side of the gripping member adjacent a point where the binding engagement and gripping members are pivotally attached together, the elongated section engaging the gripping member when the binder engagement and gripping members are aligned and preventing further pivotal movement in the first direction.

4. The chain binder extension handle according to claim 3 wherein the stop means further comprises a stop member on the head cap member that engages the gripping member and limits the pivotal movement of the gripping member in the second direction opposite to the first direction to an angle less than 90° from the aligned position of the binder engagement and gripping members.

5. The chain binder extension handle according to claim 1 wherein the resilient biasing means is a coil spring having ends that bear on the binder engagement and gripping members to urge the members into alignment, the coil spring providing increased resistance to bending as the members are pivoted further out of alignment.

6. An extension handle releasably engagable with a relatively short operating handle of a chain binder, said extension handle remaining rigid when force is applied to the extension handle in a first direction to open or close the chain binder, the extension handle being bendable in an opposite second direction as the chain binder snaps into or out of a locked position, said extension handle comprising:

a binder engagement member having a recess in an inner end thereof for releasably engaging the relatively short operating handle of the chain binder, and having an outer end directionally opposite from the recess;

a manual gripping member pivotally attached at an inner end thereof to the outer end of the binder engagement member at a pivot axis;

stop means for retaining the binder engagement and manual gripping members in an aligned position when a pivotal force is applied in the first direction but permitting relative pivotal movement of the binder engagement and manual gripping members in the opposite, second direction when a pivotal force is applied in the second direction; and resilient biasing means connected to the binder engagement member and the manual gripping member for urging the binder engagement and manual gripping members into their aligned positions, such that the extension handle operates as a rigid rod to open or close the chain binder but the extension handle resiliently bends when the chain binder snaps into its locked or unlocked position.

7. The extension handle according to claim 6 wherein the stop means comprises an elongated section of the binder engagement member that extends outwardly past the pivot axis and abuts one side of the manual gripping member when the binder engagement and manual gripping members are aligned, the elongated section being positioned to prevent relative pivotal movement of the binder engagement and manual gripping members out of their aligned positions when a pivotal force is applied in the first direction.

8. The extension handle according to claim 6 wherein the binder engagement member comprises:

a generally U-shaped head cap partially extending over and pivotally attached to the manual gripping member by a pivot pin at the pivot axis; and a generally U-shaped head jaw permanently affixed to the head cap along a jaw seam to form the recess.

9. A chain binder engagement apparatus forming a rigid supportable arm when force is applied thereto in a first direction and forming a pivotally deformable arm when force is applied thereto in a second direction, comprising:

a first member having a recessed chamber at a distal end thereof for releasably engaging a chain binder handle and having a pair of downwardly extending flaps at a proximal end thereof for supporting a pivot axis therebetween; and a second member having a gripping surface at a distal end thereof and a pair of protrusions at a proximal end thereof for engaging and pivoting about the pivot axis;

wherein each of the first and the second members contain a pair of contact surfaces configured to limit relative pivot rotation about the pivot axis to a predetermined angle; and a resilient biasing means connected to the first and the second members about the pivot axis for urging the first and the second members into a linear relation.

10. The chain binder engagement apparatus according to claim 9 wherein the predetermined angle is less than 180°.

11. The chain binder engagement apparatus according to claim 9 wherein the predetermined angle is less than 90°.

12. The chain binder engagement apparatus according to claim 9 wherein the predetermined angle is 45°.

13. An extension handle releasably engagable with a relatively short operating handle of a chain binder, said extension handle remaining rigid when force is applied to the chain binder and pivotable as the chain binder snaps into or out of a locked position, said extension handle comprising:

a binder engagement member having a recess at a distal end thereof to releasably engage the relatively short operating handle of the chain binder, said binder engagement member including:
a pivotal connecting means at a proximal end thereof;
an elongated section positioned on one side of the pivotal connecting means and extending outwardly from the binder engagement member directionally opposite from the recess; and
a head stop positioned on another side of the pivotal connecting means and protruding outwardly from the binder engagement member a shorter distance than the elongated section;

a manual gripping member pivotally attached to the binder engagement member by the pivotal connecting means, the manual gripping member including:
a first contact surface configured to contact the elongated section of the binder engagement member and confine movement of the binder engagement and manual gripping members in a first direction; and a second contact surface configured to contact the head stop to further confine relative angular movement of the binder engagement and manual gripping members to a predetermined angle no greater than 90°; and a resilient biasing means connected to the binder engagement and the manual gripping members at the pivotal connecting means for urging the binder engagement and manual gripping members into an aligned relation.

14. The extension handle according to claim 13 wherein the predetermined angle is 45°.

15. The extension handle according to claim 13 wherein the resilient biasing means is a coil spring.

* * * * *